(12) United States Patent
Jiang et al.

(10) Patent No.: US 9,924,444 B2
(45) Date of Patent: Mar. 20, 2018

(54) METHOD FOR ACCESSING WIRELESS LOCAL AREA NETWORK, AND DEVICE

(71) Applicant: Huawei Technologies Co., Ltd., Shenzhen (CN)

(72) Inventors: Yanping Jiang, Beijing (CN); Mu Zhao, Beijing (CN); Bin Zhen, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 425 days.

(21) Appl. No.: 14/561,018

(22) Filed: Dec. 4, 2014

(65) Prior Publication Data
US 2015/0085731 A1  Mar. 26, 2015

Related U.S. Application Data

(63) Continuation of application No. PCT/CN2013/072819, filed on Mar. 18, 2013.

(30) Foreign Application Priority Data

Jun. 12, 2012 (CN) .......................... 2012 1 0192727
Jan. 7, 2013 (CN) .......................... 2013 1 0005165

(51) Int. Cl.
*H04W 48/12* (2009.01)
*H04W 52/02* (2009.01)
*H04W 74/02* (2009.01)
*H04W 48/06* (2009.01)

(52) U.S. Cl.
CPC ........... *H04W 48/06* (2013.01); *H04W 48/12* (2013.01); *H04W 74/02* (2013.01); *H04W 52/0206* (2013.01); *Y02B 60/50* (2013.01)

(58) Field of Classification Search
CPC ........... H04W 74/006; H04W 74/0841; H04W 52/0219; H04W 72/12; H04W 74/02; H04W 72/0446; H04W 52/0216; H04B 7/2659; H04B 7/2646
See application file for complete search history.

(56) References Cited

U.S. PATENT DOCUMENTS

| 8,125,969 | B2 | 2/2012 | Ji et al. | |
| 2006/0114826 | A1* | 6/2006 | Brommer | H04J 3/1682 370/230 |
| 2007/0161364 | A1 | 7/2007 | Surineni et al. | |
| 2007/0230499 | A1* | 10/2007 | Iwamura | H04B 3/542 370/445 |

(Continued)

FOREIGN PATENT DOCUMENTS

| CN | 1859248 A | 11/2006 |
| CN | 101119253 A | 2/2008 |

(Continued)

*Primary Examiner* — Redentor Pasia
*Assistant Examiner* — Peter Mak
(74) *Attorney, Agent, or Firm* — Fish & Richardson P.C.

(57) ABSTRACT

Method includes: determining, by a Access Point, AP, a duration of a time segment according to the number of sensor stations and a size of uplink data and a data transmission rate of the sensor stations in a network; wherein in the time segment, only sensor stations are allowed to perform access contention; sending, by the AP, a beacon frame, wherein the beacon frame carries information about the time segment.

7 Claims, 6 Drawing Sheets

| Element identifier | Length | Duration of a first time segment | Duration of a second time segment | | |
|---|---|---|---|---|---|

| Element identifier | Length | Duration of a first time segment | Duration of a second time segment | Duration of the third time segment | |
|---|---|---|---|---|---|

| Element identifier | Length | Duration of a first time segment | Identifier of the first time segment | Duration of the third time segment | Identifier of the third time segment |
|---|---|---|---|---|---|

| Element identifier | Length | Duration of a second time segment | Identifier of the second time segment | Duration of the third time segment | Identifier of the third time segment |
|---|---|---|---|---|---|

(56) References Cited

U.S. PATENT DOCUMENTS

| | | | |
|---|---|---|---|
| 2007/0248072 A1 | 10/2007 | Kwon et al. | |
| 2008/0192723 A1 | 8/2008 | Kwon | |
| 2009/0052389 A1 | 2/2009 | Qin et al. | |
| 2010/0103913 A1* | 4/2010 | Sung | H04W 74/006 370/338 |
| 2011/0038343 A1* | 2/2011 | Bhatti | H04W 28/06 370/330 |
| 2012/0320881 A1* | 12/2012 | Hong | H04B 7/2646 370/336 |

FOREIGN PATENT DOCUMENTS

| | | |
|---|---|---|
| CN | 101242328 A | 8/2008 |
| CN | 101366247 A | 2/2009 |
| CN | 101405995 A | 4/2009 |
| CN | 101785216 A | 7/2010 |
| CN | 101932054 A | 12/2010 |
| CN | 101932055 A | 12/2010 |
| CN | 102196432 A | 9/2011 |
| WO | WO 2012043943 A1 | 4/2012 |

\* cited by examiner

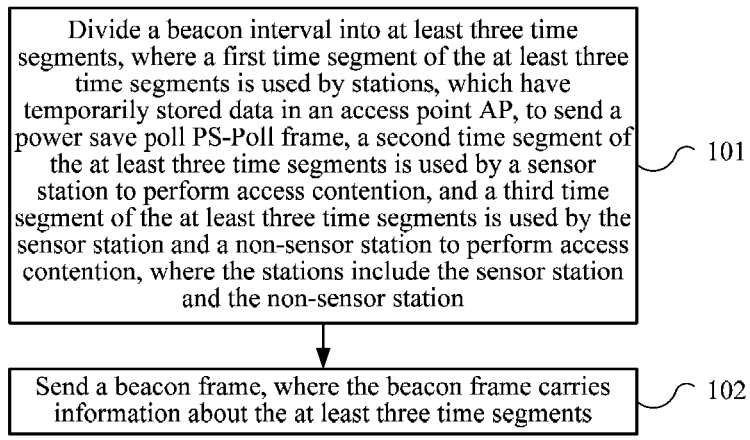
FIG. 1
FIG. 2
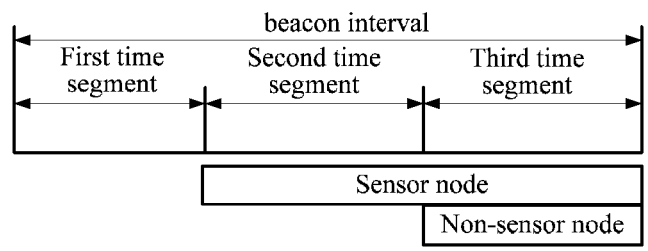
FIG. 3

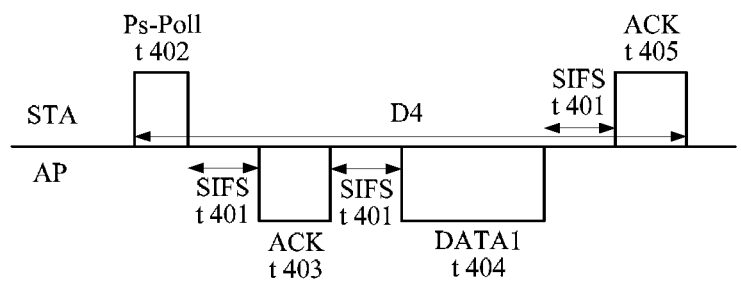
FIG. 4
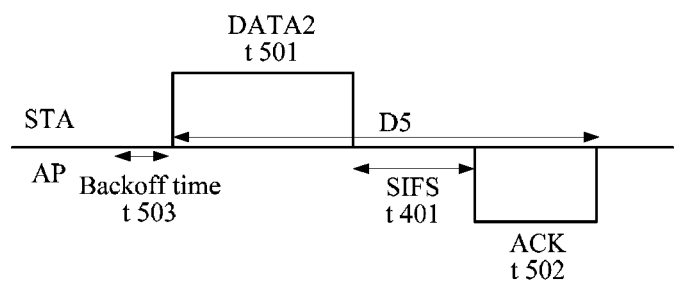
FIG. 5
| Element identifier | Length | Offset of a first time segment | Offset of a second time segment |
FIG. 6

| Element identifier | Length | Offset of a time segment in which a sensor station performs access contention | Duration of the time segment in which the sensor station performs access contention | Offset of a time segment in which all stations perform access contention | Duration of the time segment in which all the stations perform access contention |
|---|---|---|---|---|---|
| | | | | | |

FIG. 15

METHOD FOR ACCESSING WIRELESS LOCAL AREA NETWORK, AND DEVICE

CROSS-REFERENCE TO RELATED APPLICATIONS

This application is a continuation of International Patent Application No. PCT/CN2013/072819, filed on Mar. 18, 2013, which claims priority to Chinese Patent Application No. 201210192727.5, filed on Jun. 12, 2012, and Chinese Patent Application No. 201310005165.3, filed on Jan. 7, 2013, all of which are hereby incorporated by reference in their entireties.

TECHNICAL FIELD

Embodiments of the present invention relate to the field of communications technologies, and in particular, to a method for accessing a wireless local area network, and a device.

BACKGROUND

With development of network technologies, WLAN (Wireless Local Area Networks) technologies have been widely applied by individuals, families, and enterprises in places such as airports, hotels, and public recreation and entertainment places, and conference and exhibition halls. A WLAN provides a wireless broadband data access service, for example, data service offloading in a cellular network. That is, when arriving in an area within coverage of a WLAN, a user may select the WLAN network to perform a data service. The WLAN also provides some sensor application services, such as smart metering, medical treatment, environment monitoring, and home automation.

A wireless broadband data access service has a relatively high rate and relatively high power consumption, while a sensor application service has a feature of relatively low rate and relatively low power consumption. When an AP (Access Point) supports both the two types of services, that is, STAs (Station) for both the two types of services exist. In the following, a STA for the sensor application service is referred to as a sensor station, and a STA for the wireless broadband data access service is referred to as a non-sensor station. Transmit power of the sensor station is relatively low, and the sensor station is a hidden node relative to the non-sensor station in many cases. When the sensor station sends data, the non-sensor station fails to listen to a channel, and therefore mistakenly considers that the channel is idle and occupies the channel to send data. As a result, a data packet of the sensor station collides with a data packet of the non-sensor station and fails to be sent. After the collision, the data packet of the sensor station is retransmitted for multiple times, thereby increasing power consumption of the sensor station. In addition, the non-sensor station has a large traffic volume and occupies the channel for a long time. Therefore, when the non-sensor station occupies the channel, the sensor station needs to repeatedly listen on the channel, or repeatedly sleep and wake up to listen on the channel, which also increases the power consumption of the sensor station.

SUMMARY

Embodiments of the present invention provide a method for accessing a wireless local area network, and a device, which can effectively increase an access success rate of a sensor station.

According to one aspect, a method for accessing a wireless local area network is provided, including: dividing a beacon Beacon interval into at least three time segments, where a first time segment of the at least three time segments is used by stations, which have temporarily stored data in an access point AP, to send power save poll PS-Poll frames, a second time segment of the at least three time segments is used by a sensor station to perform access contention, a third time segment of the at least three time segments is used by the sensor station and a non-sensor station to perform access contention, and the stations include the sensor station and the non-sensor station; and sending a Beacon frame, where the Beacon frame carries information about the at least three time segments.

In the embodiments of the present invention, g, a Access Point, AP, determines a duration of a time segment according to the number of sensor stations and a size of uplink data and a data transmission rate of the sensor stations in a network; wherein in the time segment, only sensor stations are allowed to perform access contention; the AP sends a beacon frame, wherein the beacon frame carries information about the time segment.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a flowchart of a method for accessing a wireless local area network according to an embodiment of the present invention;

FIG. 2 is a flowchart of a method for accessing a wireless local area network according to another embodiment of the present invention;

FIG. 3 is a schematic diagram of a beacon interval divided into three time segments according to an embodiment of the present invention;

FIG. 4 is a schematic diagram of a manner of determining a first time segment of at least three time segments of a beacon interval according to an embodiment of the present invention;

FIG. 5 is a schematic diagram of a manner of determining a second time segment of at least three time segments of a beacon interval according to another embodiment of the present invention;

FIG. 6 is a schematic diagram of a manner of carrying information about three time segments by a beacon frame according to an embodiment of the present invention;

FIG. 15 is a schematic diagram of a manner of carrying information about two time segments by a Beacon frame according to an embodiment of the present invention.

DESCRIPTION OF EMBODIMENTS

Figures 7, 8:
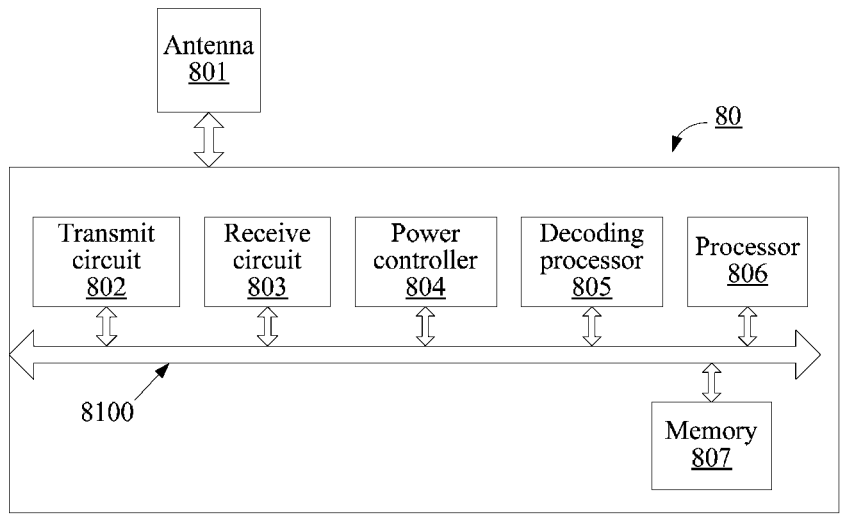
FIG. 7 is a schematic diagram of a manner of carrying information about three time segments by a beacon frame according to another embodiment of the present invention.
FIG. 8 is a block diagram of a device according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Technical solutions of the present invention may be applied in various communications systems, such as a Global System for Mobile Communications (GSM), a Code Division Multiple Access (CDMA) system, Wideband Code Division Multiple Access (WCDMA), a General Packet Radio Service (GPRS), and Long Term Evolution (LTE).

A WLAN network may be a WiFi network, or may be a WiMAX (Worldwide Interoperability for Microwave Access) network, a WAPI (WLAN Authentication and Privacy Infrastructure) network, or the like.

Stations (STA) include a sensor station and a non-sensor station. A sensor station is a device having functions such as signal collection, data processing, and wireless communication in a sensor application service of a WLAN network. A non-sensor station is a device communicating with an access point in other application services except the sensor application service of the WLAN network. For example, the non-sensor station may be a fixed terminal, or may be a mobile terminal, such as a mobile phone (or referred to as a "cellular" phone) or a computer with a mobile terminal.

FIG. 1 is a flowchart of a method for accessing a wireless local area network according to an embodiment of the present invention. The method in FIG. 1 is executed by an AP (Access Point).

101: Divide a beacon Beacon interval into at least three time segments, where a first time segment of the at least three time segments is used by stations, which have temporarily stored data in the access point AP, to send PS-Poll (Power Save Poll, power save poll) frames, a second time segment of the at least three time segments is used by a sensor station to perform access contention, a third time segment of the at least three time segments is used by the sensor station and a non-sensor station to perform access contention, and the stations include the sensor station and the non-sensor station.

It should be noted that a manner of determining each of the at least three time segments into which the Beacon interval is divided is not limited in this embodiment of the present invention. That is, whatever manner of determining each of the at least three time segments into which the Beacon interval is divided falls into the scope of this embodiment of the present invention.

Optionally, as an embodiment, duration of the second time segment of the at least three time segments of the Beacon interval may be determined according to the number of sensor stations and a size of uplink data and a data transmission rate of the sensor station. A minimum data transmission rate, an average data transmission rate, or the like may be used as the data transmission rate. It should be understood that the data transmission rate is not limited in the present invention.

For example, the number N of sensor stations is determined according to a TIM (Traffic Indication Map, traffic indication map) flag in a current Beacon frame; time t required for an entire process, in which the sensor station sends uplink data to the AP and the AP replies to the sensor station with an acknowledgment ACK after the AP receives the uplink data, is determined according to the size of the uplink data and the data transmission rate of the sensor station; and the number N of sensor stations is multiplied by the time t, to obtain duration D1 of the second time segment.

For another example, the number M1 of sensor stations that wake up in a current Beacon interval is determined according to periods of uplink data of the sensor stations; and the number M1 of sensor stations is multiplied by time t that is determined by using the foregoing method, to obtain duration D2 of the second time segment.

For yet another example, N sensor stations are determined according to a TIM flag in a current Beacon frame; the number M2 of sensor stations that wake up in a current beacon Beacon interval is determined according to periods of uplink data of the N sensor stations; and the number M2 of sensor stations is multiplied by time t that is determined by using the foregoing method, to obtain duration D3 of the second time segment.

Further, the duration of the second time segment of the at least three time segments does not exceed duration of the Beacon interval minus duration of the first time segment of the at least three time segments.

With reference to an example in FIG. 5, the following further describes in detail a nonrestrictive implementation manner of determining the second time segment of the at least three time segments of the Beacon interval.

102: Send a Beacon frame, where the Beacon frame carries information about the foregoing at least three time segments.

The AP periodically sends the Beacon frame in a broadcast manner.

Optionally, as an embodiment, the Beacon frame may carry a first time offset of an end time point, of the first time segment of the at least three time segments, relative to a start point of the Beacon interval, and a second time offset of an end time point, of the second time segment of the at least three time segments, relative to the start point of the Beacon interval.

Optionally, as another embodiment, the Beacon frame may carry the duration of the first time segment of the at least three time segments and the duration of the second time segment of the at least three time segments.

With reference to examples in FIG. 6 and FIG. 7, the following further describes in more detail implementation manners of carrying the information about the at least three time segments by the Beacon frame.

In this embodiment of the present invention, an access point divides a beacon Beacon interval into at least three time segments, where a first time segment is used by stations, which have temporarily stored data in the AP, to send PS-Poll frames, a second time segment is used by a sensor station to perform access contention, and a third time segment is used by the sensor station and a non-sensor station to perform access contention. In this way, a power consumption increase caused by simultaneous contention of the sensor station and the non-sensor station can be suppressed, and an access success rate of the sensor station can be effectively increased.

FIG. 2 is a flowchart of a method for accessing a wireless local area network according to another embodiment of the present invention. The method in FIG. 2 is executed by a station, and corresponds to the method in FIG. 1. Therefore, description of a part that is the same as that of the embodiment in FIG. 1 is omitted properly to avoid repetition.

201: Receive a Beacon frame sent by an AP, where the Beacon frame carries information about at least three time segments, a first time segment of the at least three time segments is used by stations, which have temporarily stored data in the AP, to send PS-Poll frames, a second time segment of the at least three time segments is used by a sensor station to perform access contention, a third time segment of the at least three time segments is used by the sensor station and a non-sensor station to perform access contention, and the stations include the sensor station and the non-sensor station.

Optionally, as an embodiment, the Beacon frame may carry a first time offset of an end time point, of the first time segment of the at least three time segments, relative to a start point of a Beacon interval, and a second time offset of an end time point, of the second time segment of the at least three time segments, relative to the start point of the Beacon interval.

Optionally, as another embodiment, the Beacon frame may carry duration of the first time segment of the at least three time segments and duration of the second time segment of the at least three time segments.

With reference to examples in FIG. 6 and FIG. 7, the following further describes in more detail implementation manners of carrying the information about the at least three time segments by the Beacon frame.

In addition, the non-sensor station may enter a sleep state in the second time segment of the at least three time segments according to the information about the at least three time segments. In this way, power consumption can be effectively reduced.

In this embodiment of the present invention, a station receives a Beacon frame sent by an access point, and acquires information about at least three time segments that is carried in the Beacon frame, where a first time segment is used by stations, which have temporarily stored data in the AP, to send PS-Poll frames, a second time segment is used by a sensor station to perform access contention, and a third time segment is used by the sensor station and a non-sensor station to perform access contention. In this way, a power consumption increase caused by simultaneous contention of the sensor station and the non-sensor station can be suppressed, and an access success rate of the sensor station can be effectively increased.

The following describes in detail this embodiment of the present invention with reference to specific examples.

FIG. 3 is a schematic diagram of a Beacon interval divided into three time segments according to an embodiment of the present invention. It should be understood that in this embodiment of the present invention, although FIG. 3 shows that the Beacon interval is divided into the three time segments, such division is merely for ease of description. The Beacon interval may also be divided into more than three time segments, which is not limited in this embodiment of the present invention. In addition, in this embodiment of the present invention, a manner of determining each of the at least three time segments into which the Beacon interval is divided is not limited. That is, whatever manner of determining each of the at least three time segments into which the Beacon interval is divided falls into the scope of this embodiment of the present invention.

As shown in FIG. 3, in a first time segment of the at least three time segments of the Beacon interval, STAs are in a sleep state to save power, an AP needs to first temporarily store data DATA1, which is to be sent to the STAs in the sleep state, and the STAs periodically wake up to listen to a Beacon frame. The Beacon frame carries a TIM, where the TIM is used by the AP to indicate that the AP needs to send temporarily stored downlink data packets to those STAs in the current Beacon interval. When a STA finds, by listening to a TIM frame, that the AP has a data packet to send to the STA, the STA sends a PS-Poll frame to the AP, so as to notify the AP that the STA is ready to receive the corresponding data packet in the current Beacon interval. When receiving the PS-Poll, the AP replies to the STA with an acknowledgment ACK frame, and sends a temporarily stored data packet to the STA. The STA receives the data packet and replies to the AP with an ACK.

Optionally, in the first time segment of the at least three time segments of the Beacon interval, a PS-Poll+ACK+DATA1+ACK communication process between the STA and the AP can be completed. Further, if the AP has corresponding downlink temporarily stored data to send to the STA, the STA wakes up at the beginning of a timeslot that belongs to the STA, and continues to sleep after completing the PS-Poll+ACK+DATA1+ACK communication process with the AP. In this way, power consumption of the STA can be reduced.

With reference to an example in FIG. 4, the following further describes in detail a manner of determining the first time segment of the at least three time segments of the Beacon interval.

In FIG. 3, a second time segment of the at least three time segments of the Beacon interval is used by a sensor station to contend for access to a channel, so as to send uplink data to the AP. Therefore, a power consumption increase caused by simultaneous contention of the sensor station and a non-sensor station can be avoided, and an access success rate of the sensor station can be increased. A third time segment of the at least three time segments of the Beacon interval is used by the sensor station and a non-sensor station to contend for access to a channel, so as to send uplink data to the AP. Optionally, if a sensor station fails to contend for a channel within the second time segment to send uplink data to the AP, the sensor station may continue to contend for access to a channel in the third time segment. In this way, a requirement that the sensor station takes precedence during channel accessing is met. Optionally, the non-sensor station may enter a sleep state in the second time segment, and wakes up at the beginning of the third time segment so as to contend for a channel to send uplink data. In this way, power consumption of the non-sensor station can be reduced.

Optionally, as an embodiment, the first time segment of the at least three time segments of the Beacon interval is divided into N1 equal timeslots slot1, that is, duration of the first time segment is N1*slot1. N1 may be equal to the number of STAs whose TIM flag in the current Beacon frame is 1.

FIG. 4 is a schematic diagram of a manner of determining a first time segment of at least three time segments of a Beacon interval according to an embodiment of the present invention.

Specifically, as shown in FIG. 4, an SIFS (short interframe space, short interframe space) represents an interframe time length t 401; within one slot1, a STA first sends a PS-Poll to an AP (required time is recorded as t 402), the AP replies to the STA with an ACK (required time is recorded as t 403), then the AP sends temporarily stored data DATA1 to the STA (required time is recorded as t 404), and the STA replies with an ACK (required time is recorded as t 405). Therefore, duration D4 of the first time segment of the at least three time segments of the Beacon interval is as follows: D4 (t 402+t 401+t 403+t 401+t 404+t 401+t 405)*N1. The PS-Poll and the ACK have relatively fixed packet lengths. Therefore, as an implementation manner, time required for transmitting the PS-Poll and the ACK may be obtained by using a minimum data transmission rate. The AP has learned a packet length of the temporarily stored data DATA1. Therefore, as an implementation manner, time required for transmitting DATA1 may also be obtained by using the minimum data transmission rate.

In this embodiment of the present invention, an access point divides a beacon Beacon interval into at least three time segments, where a first time segment is used by stations, which have temporarily stored data in the AP, to send PS-Poll frames, a second time segment is used by a sensor station to perform access contention, and a third time segment is used by the sensor station and a non-sensor station to perform access contention. In this way, a power consumption increase caused by simultaneous contention of the sensor station and the non-sensor station can be suppressed, and an access success rate of the sensor station can be effectively increased.

Optionally, as another embodiment, time t2 required by the sensor station to complete transmission of uplink data may be determined according to a size of the uplink data and a data transmission rate of the sensor station; and if the number of sensor stations is N2, duration of a second time segment of the at least three time segments of the Beacon interval is N2*t2. For example, a value of N2 may be the number, which is determined according to a TIM flag in a current Beacon frame, of all sensor stations; or a value of N2 may be the number, which is determined according to periods of uplink data of the sensor stations, of sensor stations that wake up in a current Beacon interval; or N sensor stations are first determined according to a TIM flag in a current Beacon frame, and a value of N2 may be the number, which is determined according to periods of uplink data of the N sensor stations, of sensor stations that wake up in a current beacon Beacon interval. Optionally, at an association stage, a STA may notify the AP of a service type of the STA in advance, and a period of uplink data may be determined according to a service type of a sensor application of a WLAN network. For example, the AP determines the number of sensor stations, which wake up in the current Beacon interval, according to a periodic feature of reporting time of electricity meter data, health information, environment monitoring information, and the like.

FIG. 5 is a schematic diagram of a manner of determining a second time segment of at least three time segments of a Beacon interval according to another embodiment of the present invention.

Specifically, as shown in FIG. 5, within one t2, a STA sends uplink data DATA2 to an AP (required time is recorded as t 501), and the AP replies to the STA with an ACK (required time is recorded as t 502). Therefore, duration of the second time segment of the at least three time segments of the Beacon interval is as follows: D5=(t 501+t 401+t 502)*N2. Optionally, backoff time of each sensor station during access contention may be considered. For example, the AP collects statistics on the number of sensor stations in a current network, and acquires an empirical value t 503 of average backoff time, which corresponds to the number, of each sensor station during access contention. Therefore, the duration of the second time segment of the at least three time segments of the Beacon interval is as follows: D5=(t 501+t 401+t 502+t 503)*N2. The uplink data DATA2 sent by the sensor station has a relatively short and fixed packet length, for example, the packet length of the uplink data DATA2 is 256 bytes. It should be understood that a value of the size of the uplink data is merely exemplary, and this embodiment of the present invention is not limited thereto. Optionally, time required for transmitting DATA2 may be obtained according to the packet length of DATA2 and a minimum data transmission rate, or time required for transmitting DATA2 may be obtained according to the packet length of DATA2 and an average data transmission rate. It should be understood that the minimum data transmission rate, the average data transmission rate, or the like may be used as a data transmission rate, which is not limited in the present invention.

Further, the duration of the second time segment of the at least three time segments does not exceed duration of the Beacon interval minus duration of a first time segment of the at least three time segments.

A second time segment of at least three time segments of a Beacon interval is used by a sensor station to contend for access to a channel, so as to send uplink data to an AP. Therefore, a power consumption increase caused by simultaneous contention of the sensor station and a non-sensor station can be avoided, and an access success rate of the sensor station can be increased. Optionally, the non-sensor station may enter a sleep state in the second time segment, and wakes up at the beginning of a third time segment so as to contend for a channel to send uplink data. In this way, power consumption of the non-sensor station can be reduced.

FIG. 6 is a schematic diagram of a manner of carrying information about three time segments by a Beacon frame according to an embodiment of the present invention. In this embodiment of the present invention, although FIG. 6 shows a manner of carrying the information about the three time segments by the Beacon frame, such a manner is merely for ease of description. The Beacon frame may also carry information about more than three time segments, which is not limited in this embodiment of the present invention. In addition, in this embodiment of the present invention, a manner of determining each of at least three time segments into which a Beacon interval is divided is not limited. That is, whatever manner of determining each of the at least three time segments into which the Beacon interval is divided falls into the scope of this embodiment of the present invention. It should also be understood that a manner of acquiring the three time segments is not limited in this embodiment of the present invention.

As shown in FIG. 6, an IE (Information Element, information element) includes three parts: an element identifier Element ID field, a length Length field, and a variable-length information Information field. The Element ID field is used for indicating a type of the IE, and it is defined in a standard that a specific Element ID is allocated to each type of element. Optionally, in this embodiment of the present invention, IDs 222 to 255 that are not allocated and are reserved in the standard may be used. The Length field is used for indicating the number of bytes occupied by the variable-length Information field. The variable-length Information field may indicate a first time offset Timeoffset1 of an end time point, of a first time segment of the three time segments, relative to a start point (for example, a flag is 0) of a Beacon interval, and a second time offset Timeoffset2 of an end time point, of a second time segment of the three time segments, relative to the start point of the Beacon interval.

In this embodiment of the present invention, an access point sends a Beacon frame, and a station receives the Beacon frame and acquires information about Timeoffset1 and Timeoffset2, where the information is carried in the Beacon frame. A first time segment is [0, Timeoffset1] in a Beacon interval, and is used by stations, which have temporarily stored data in the AP, to send power save poll PS-Poll frames. A second time segment is [Timeoffset1, Timeoffset2] in the Beacon interval, and is used by a sensor station to perform access contention. A third time segment is between the Timeoffset2 and an end point of the Beacon interval, and is used by the sensor station and a non-sensor station to perform access contention. Therefore, a power consumption increase caused by simultaneous contention of the sensor station and the non-sensor station can be effectively suppressed, and an access success rate of the sensor station can be effectively increased.

In addition, the non-sensor station may enter a sleep state in the second time segment of the at least three time segments according to the information about the at least three time segments. In this way, power consumption of the non-sensor station can be effectively reduced.

FIG. 7 is a schematic diagram of a manner of carrying information about three time segments by a Beacon frame according to another embodiment of the present invention. In this embodiment of the present invention, although FIG. 7 shows a manner of carrying the information about the three time segments by the Beacon frame, such a manner is merely for ease of description. The Beacon frame may also carry information about more than three time segments, which is not limited in this embodiment of the present invention. In addition, in this embodiment of the present invention, a manner of determining each of at least three time segments into which a Beacon interval is divided is not limited. That is, whatever manner of determining each of the at least three time segments into which the Beacon interval is divided falls into the scope of this embodiment of the present invention. It should also be understood that a manner of acquiring the three time segments is not limited in this embodiment of the present invention.

As shown in FIG. 7, an Element ID field is used for indicating a type of an IE. Optionally, in this embodiment of the present invention, IDs 222 to 255 that are not allocated and are reserved in a standard may be used. A Length field is used for indicating the number of bytes occupied by a variable-length Information field. The variable-length Information field may indicate duration Duration1 of a first time segment of the three time segments and duration Duration2 of a second time segment of the three time segments. Alternatively, the variable-length Information field may indicate duration Duration1 of a first time segment of the three time segments, duration Duration2 of a second time segment of the three time segments, and duration Duration3 of a third time segment. For example, if the variable-length Information field indicates Duration1 and Duration2, the first time segment is between a start point of a Beacon interval and a time point of which an offset is a length of Duration1 relative to the start point of the Beacon interval, that is, [0, Duration1]; the second time segment is between an end point of the first time segment and a time point of which an offset is a length of Duration1 plus Duration2 relative to the start point of the Beacon interval, that is, [Duration1, Duration1+Duration2]; and the third time segment is between an end point of the second time segment and an end point of the Beacon interval. Alternatively, if the variable-length Information field indicates Duration1, Duration2, and Duration3, the first time segment is between a start point of a Beacon interval and a time point of which an offset is a length of Duration1 relative to the start point of the Beacon interval, that is, [0, Duration1]; the second time segment is between an end point of the first time segment and a time point of which an offset is a length of Duration1 plus Duration2 relative to the start point of the Beacon interval, that is, [Duration1, Duration1+Duration2]; and the third time segment is between an end point of the second time segment and a time point of which an offset is a length of Duration1 plus Duration2 plus Duration3 relative to the start point of the Beacon interval, that is, [Duration1+Duration2, Duration1+Duration2+Duration3].

Optionally, as another implementation manner, the variable-length Information field may indicate duration Duration1 of a first time segment of the at least three time segments, an identifier index1 of the first time segment, duration Duration3 of a third time segment of the at least three time segments, and an identifier index3 of the third time segment. Alternatively, the variable-length Information field may indicate duration Duration2 of a second time segment of the at least three time segments, an identifier index2 of the second time segment, duration Duration3 of a third time segment of the at least three time segments, and an identifier index3 of the third time segment. At an association stage, an AP may notify a STA of duration Duration0 of a Beacon interval in advance. For example, the variable-length Information field indicates Duration2, index2, Duration3, and index3. Therefore, the first time segment is between an end point of the first time segment and a time point at which an offset is a length of Duration0 minus Duration2 minus Duration3 relative to a start point of the Beacon interval, that is, [0, Duration0-Duration2-Duration3]; the second time segment is between the end point of the first time segment and a time point at which an offset is a length of Duration0 minus Duration3 relative to the start point of the Beacon interval, that is, [Duration0-Duration2-Duration3, Duration0-Duration3]; and the third time segment is between an end point of the second time segment and an end point of the Beacon interval. For acquiring of the three time segments when the variable-length Information field indicates Duration2, index2, Duration3, and index3, refer to the foregoing manner, which is not described again.

In this embodiment of the present invention, an access point divides a beacon Beacon interval into at least three time segments, where a first time segment is used by stations, which have temporarily stored data in the access point AP, to send PS-Poll frames, a second time segment is used by a sensor station to perform access contention, and a third time segment is used by the sensor station and a non-sensor station to perform access contention. In this way, a power consumption increase caused by simultaneous contention of the sensor station and the non-sensor station can be suppressed, and an access success rate of the sensor station can be effectively increased.

In addition, the non-sensor station may enter a sleep state in the second time segment of the at least three time segments according to the information about the at least three time segments. In this way, power consumption of the non-sensor station can be effectively reduced.

An embodiment of the present invention further provides an apparatus embodiment for implementing the steps and the methods in the foregoing method embodiments. This embodiment of the present invention may be applied to an access point or a terminal in various wireless local area network WLAN systems. FIG. 8 shows an embodiment of a user equipment 80. In this embodiment, the equipment 80 includes a transmit circuit 802, a receive circuit 803, a power controller 804, a decoding processor 805, a processor 806, a memory 807, and an antenna 801. The processor 806 controls an operation of the equipment 80. The processor 806 may also be referred to as a central processing unit CPU or a processor. The memory 807 may include a read-only memory and a random access memory, and provide an instruction and data to the processor 806. A part of the memory 807 may further include a non-volatile random access memory (NVRAM). In a specific application, the equipment 80 may be built in or may be a wireless communications device such as a mobile phone, and may further include a carrier accommodating the transmit circuit 802 and the receive circuit 803, so as to allow the equipment 80 to perform data transmission and receiving with a remote position. The transmit circuit 802 and the receive circuit 803 may be coupled to the antenna 801. Components of the equipment 80 are coupled together by using a bus system 8100. In addition to a data bus, the bus system 8100 further includes a power bus, a control bus, and a status signal bus. However, for clear description, the various buses in the figure are marked as the bus system 8100. The equipment 80 may further include the processor 806 configured to process a signal, and further includes the power controller 804 and the decoding processor 805.

The methods disclosed in the foregoing embodiments of the present invention may be applied to the foregoing equipment 80, or in other words, may be mainly implemented by the processor 806 and the transmit circuit 802 that are in the equipment 80. The processor 806 may be an integrated circuit chip having a capacity of processing a signal. In an implementation process, the steps of the foregoing methods may be implemented by using an integrated logic circuit of hardware in the processor 806 or an instruction in the form of software. To execute the methods disclosed in the embodiments of the present invention, the foregoing decoding processor may be a general processor, a digital signal processor (DSP), an application-specific integrated circuit (ASIC), a field programmable gate array (FPGA), another programmable logic device, a discrete gate or a transistor logic device, or a discrete hardware component, which can implement or execute the methods, the steps, and the logical block diagrams disclosed in the embodiments of the present invention. The general processor may be a microprocessor, or the processor may also be any conventional processor or decoder, or the like. The steps in the methods disclosed in the embodiments of the present invention may be directly implemented by a hardware decoding processor, or may be implemented by a combination of a hardware module and a software module in the decoding processor. The software module may be located in a mature storage medium in the art, such as a random access memory, a flash memory, a read-only memory, a programmable read-only memory, an electrically erasable programmable memory, or a register. The storage medium is located in the memory 807, and a decoding processor reads information in the memory 807 and implements the steps of the foregoing methods in combination with hardware of the decoding unit.

Figure 9:
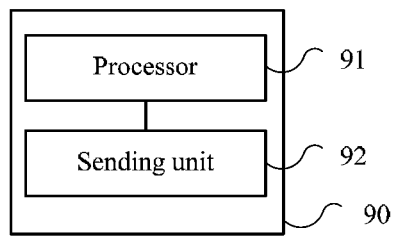
FIG. 9 is a block diagram of an access point according to an embodiment of the present invention.

Further, FIG. 9 is a block diagram of an access point according to an embodiment of the present invention. The access point 90 in FIG. 9 includes a processor 91 and a sending unit 92.

The processor 91 is configured to divide a beacon Beacon interval into at least three time segments, where a first time segment of the at least three time segments is used by stations, which have temporarily stored data in the access point AP, to send PS-Poll frames, a second time segment of the at least three time segments is used by a sensor station to perform access contention, a third time segment of the at least three time segments is used by the sensor station and a non-sensor station to perform access contention, and the stations include the sensor station and the non-sensor station.

The sending unit 92 is configured to send a Beacon frame, where the Beacon frame carries information about the at least three time segments obtained through division by the processor 91. The sending unit may be the foregoing transmit circuit or may be a part of the foregoing transmit circuit.

In this embodiment of the present invention, an access point divides a beacon Beacon interval into at least three time segments, where a first time segment is used by stations, which have temporarily stored data in the AP, to send PS-Poll frames, a second time segment is used by a sensor station to perform access contention, and a third time segment is used by the sensor station and a non-sensor station to perform access contention. In this way, a power consumption increase caused by simultaneous contention of the sensor station and the non-sensor station can be suppressed, and an access success rate of the sensor station can be effectively increased.

The access point 90 can implement the operations related to the access point in the embodiments in FIG. 1 to FIG. 7, and therefore is not described in detail to avoid repetition.

Optionally, as an embodiment, the processor 91 is further configured to determine duration of the second time segment of the at least three time segments according to the number of sensor stations and a size of uplink data and a data transmission rate of the sensor station. Further, the processor 91 is specifically configured to determine the number N of sensor stations according to a TIM flag in a current Beacon frame, determine, according to the size of the uplink data and the data transmission rate of the sensor station, time t required for completing transmission of the uplink data, and multiply the number N of sensor stations by the time t, to obtain duration D1 of the second time segment of the at least three time segments; or is specifically configured to determine, according to periods of uplink data of the sensor stations, the number M1 of sensor stations that wake up in a current Beacon interval, determine, according to the size of the uplink data and the data transmission rate of the sensor station, time t required for completing transmission of the uplink data, and multiply the number M1 of sensor stations by the time t, to obtain duration D2 of the second time segment of the at least three time segments; or is specifically configured to determine N sensor stations according to a TIM flag in a current Beacon frame, determine, according to periods of uplink data of the N sensor stations, the number M2 of sensor stations that wake up in a current beacon Beacon interval, determine, according to the size of the uplink data and the data transmission rate of the sensor station, time t required for completing transmission of the uplink data, and multiply the number M2 of sensor stations by the time t, to obtain duration D3 of the second time segment of the at least three time segments.

Figure 10:
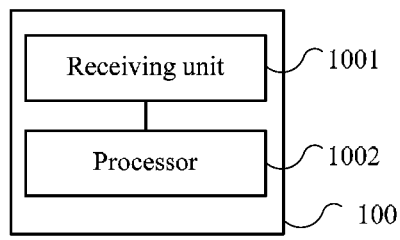
FIG. 10 is a block diagram of a station according to another embodiment of the present invention.

FIG. 10 is a block diagram of a station according to another embodiment of the present invention. The station 100 in FIG. 10 includes a receiving unit 1001 and an processor unit 1002.

The receiving unit 1001 is configured to receive a Beacon frame sent by an access point AP. In terms of a specific product form, the receiving unit may be the foregoing receive circuit or a part of the foregoing receive circuit.

The processor 1002 is configured to obtain information about at least three time segments that is carried in the Beacon frame received by the receiving unit 1001. A first time segment of the at least three time segments is used by stations, which have temporarily stored data in the access point AP, to send PS-Poll frames, a second time segment of the at least three time segments is used by a sensor station to perform access contention, a third time segment of the at least three time segments is used by the sensor station and a non-sensor station to perform access contention, and the stations include the sensor station and the non-sensor station.

In this embodiment of the present invention, an access point sends a Beacon frame, and a station receives the Beacon frame and acquires information about at least three time segments that is carried in the Beacon frame, where a first time segment is used by stations, which have temporarily stored data in the AP, to send PS-Poll frames, a second time segment is used by a sensor station to perform access contention, and a third time segment is used by the sensor station and a non-sensor station to perform access contention. In this way, a power consumption increase caused by simultaneous contention of the sensor station and the non-sensor station can be suppressed, and an access success rate of the sensor station can be effectively increased.

The station 100 can implement the operations related to the station in the embodiments in FIG. 1 to FIG. 7, and therefore is not described in detail to avoid repetition.

Optionally, as an embodiment, the processor 1002 is specifically configured to acquire a first time offset of an end time point, of the first time segment of the at least three time segments, relative to a start point of a Beacon interval, and a second time offset of an end time point, of the second time segment of the at least three time segments, relative to the start point of the Beacon interval, where the at least three time segments are carried in the Beacon frame received by the receiving unit 1001. Alternatively, the processor 1002 is specifically configured to acquire duration of the first time segment of the at least three time segments and duration of the second time segment of the at least three time segments, where the at least three time segments are carried in the Beacon frame received by the receiving unit 1001.

In addition, the non-sensor station may enter a sleep state in the second time segment of the at least three time segments according to the information about the at least three time segments. In this way, power consumption can be effectively reduced.

A communications system according to an embodiment of the present invention may include the foregoing access point 90 or the foregoing station 100.

Figure 11:
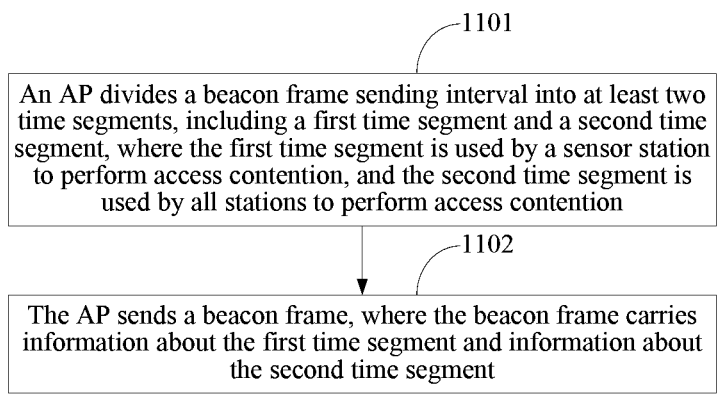
FIG. 11 is a flowchart of a method for accessing a wireless local area network according to still another embodiment of the present invention.

Further, FIG. 11 is a flowchart of a method for accessing a wireless local area network according to still another embodiment of the present invention. The method in FIG. 11 is executed by an AP (Access Point, access point).

1101: The AP divides a beacon frame sending interval into at least two time segments, where the at least two time segments include a first time segment and a second time segment, the first time segment is used by a sensor station to perform access contention, and the second time segment is used by all stations to perform access contention.

In this embodiment, the all stations include a non-sensor station and the sensor station. It should be noted that a manner of determining each of the two time segments into which the Beacon interval is divided is not limited in this embodiment of the present invention.

Optionally, as an embodiment, duration of the time segment, in which the sensor station performs access contention, of the Beacon interval may be determined according to the number of sensor stations and a size of uplink data and a data transmission rate of the sensor station. A minimum data transmission rate, an average data transmission rate, or the like may be used as the data transmission rate. It should be understood that the data transmission rate is not limited in the present invention.

For example, the number N of sensor stations is determined according to a TIM (Traffic Indication Map, traffic indication map) flag in a current Beacon frame; time t required by an entire process, in which a sensor station sends uplink data to the AP and the AP replies to the sensor station with an acknowledgment ACK after the AP receives the uplink data, is determined according to the size of the uplink data and the data transmission rate of the sensor station; and the number N of sensor stations is multiplied by the time t, to obtain duration D1 of the time segment in which the sensor station performs access contention.

For another example, the number M1 of sensor stations that wake up in a current Beacon interval is determined according to periods of uplink data of the sensor stations; and the number M1 of sensor stations is multiplied by time t that is determined by using the foregoing method, to obtain duration D2 of the time segment in which the sensor station performs access contention.

For yet another example, N sensor stations are determined according to a TIM flag in a current Beacon frame; the number M2 of sensor stations that wake up in a current beacon Beacon interval is determined according to periods of uplink data of the N sensor stations; and the number M2 of sensor stations is multiplied by time t that is determined by using the foregoing method, to obtain duration D3 of the time segment in which the sensor station performs access contention.

Further, the duration of the time segment in which the sensor station performs access contention does not exceed duration of the Beacon interval.

With reference to the example in FIG. 5, the following further describes in detail a nonrestrictive implementation manner of determining the time segment, in which the sensor station performs access contention, of the Beacon interval.

1102: The AP sends a Beacon frame, where the Beacon frame carries information about the first time segment and information about the second time segment.

The AP periodically sends the Beacon frame in a broadcast manner.

The Beacon frame may carry a time offset of a start time point, of the time segment in which the sensor station performs access contention, relative to a start time point of the beacon interval, duration of the time segment in which the sensor station performs access contention, a time offset of a start time point, of the time segment in which all stations perform access contention, relative to the start time point of the beacon interval, and duration of the time segment in which all stations perform access contention.

In this embodiment of the present invention, an access point divides a beacon interval into two time segments, where a first time segment is used by a sensor station to perform access contention, and a second time segment is used by all stations to perform access contention, where the all stations include the sensor station and a non-sensor station. In this way, a power consumption increase caused by simultaneous contention of the sensor station and the non-sensor station can be suppressed, and an access success rate of the sensor station can be effectively increased.

Figure 12:
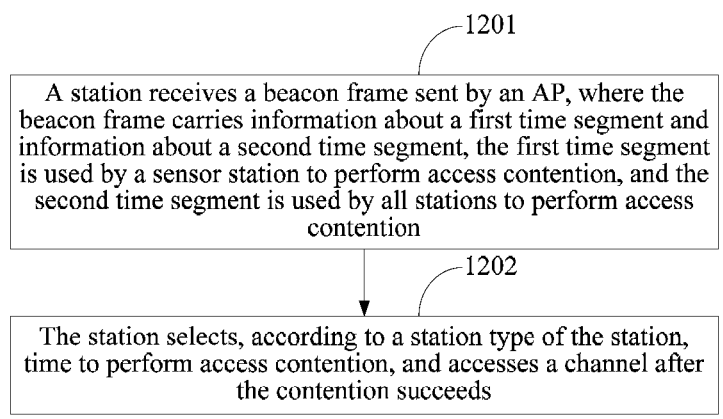
FIG. 12 is a flowchart of a method for accessing a wireless local area network according to yet another embodiment of the present invention.

FIG. 12 is a flowchart of a method for accessing a wireless local area network according to another embodiment of the present invention. The method in FIG. 12 is executed by a station, and corresponds to the method in FIG. 11. Therefore, description of a part that is the same as that of the embodiment in FIG. 11 is omitted properly to avoid repetition.

1201: A station receives a Beacon frame sent by an AP, where the Beacon frame carries information about a first time segment and information about a second time segment, the first time segment is used by a sensor station to perform access contention, and the second time segment is used by all stations to perform access contention.

1202: The station selects, according to a station type of the station, time to perform channel contention, and accesses a channel after the contention succeeds.

In this embodiment, the stations at least include a non-sensor station and the sensor station.

Optionally, as an embodiment, the Beacon frame may carry a time offset of a start time point, of the time segment in which the sensor station performs access contention, relative to a start time point of a beacon interval, and duration of the time segment in which the sensor station performs access contention; and a time offset of a start time point, of the time segment in which all stations perform access contention, relative to the start time point of the beacon interval, and duration of the time segment in which all stations perform access contention.

In addition, the non-sensor station may enter, according to the information about the two time segments, a sleep state in the time segment in which the sensor station performs access contention. In this way, power consumption can be effectively reduced.

In this embodiment of the present invention, a station receives a Beacon frame sent by an access point, and acquires information about two time segments that is carried in the Beacon frame, where one time segment is used by a sensor station to perform access contention, the other time segment is used by all stations to perform access contention, and the all stations include the sensor station and a non-sensor station. In this way, a power consumption increase caused by simultaneous contention of the sensor station and the non-sensor station can be suppressed, and an access success rate of the sensor station can be effectively increased.

The following describes in detail this embodiment of the present invention with reference to specific examples.

Figure 13:
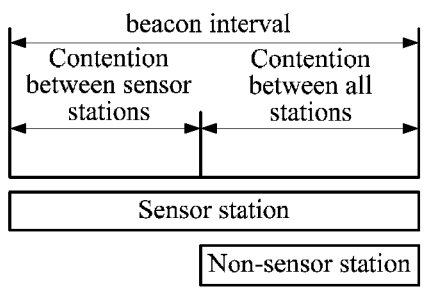
FIG. 13 is a schematic diagram of a beacon interval divided into two time segments according to an embodiment of the present invention.

FIG. 13 is a schematic diagram of a Beacon interval divided into two time segments according to an embodiment of the present invention. It should be understood that in this embodiment of the present invention, although FIG. 3 shows that the Beacon interval is divided into two time segments, such division is merely for ease of description. The Beacon interval may also be divided into more than two time segments, which is not limited in this embodiment of the present invention, or in other words, a part of time segments in the interval is divided into a first time segment and a second time segment, that is, the first time segment and the second time segment may not be all of the Beacon interval.

A time segment, in which a sensor station performs access contention, of the Beacon interval is used by the sensor station to contend for access to a channel, so as to send uplink data to an AP. Therefore, a power consumption increase caused by simultaneous contention of the sensor station and a non-sensor station can be avoided, and an access success rate of the sensor station can be increased. A time segment, in which all stations perform access contention, of the two time segments of the Beacon interval is used by the sensor station and a non-sensor station to contend for access to a channel, so as to send uplink data to the AP. Optionally, if a sensor station fails to contend for a channel, within the time segment in which the sensor station performs the access content, to send uplink data to the AP, the sensor station may continue to contend for access to a channel in the time segment in which all stations perform access contention. In this way, a requirement that the sensor station takes precedence during channel accessing is met. Optionally, the non-sensor station may enter a sleep state in the time segment in which the sensor station performs access contention, and wakes up at the beginning of the time segment in which all stations perform access contention, so as to contend for a channel to send uplink data. In this way, power consumption of the non-sensor station can be reduced.

In this embodiment of the present invention, an access point divides a beacon Beacon interval into two time segments, where one time segment is used by a sensor station to perform access contention, the other time segment is used by all stations to perform access contention, and the all stations include the sensor station and a non-sensor station. In this way, a power consumption increase caused by simultaneous contention of the sensor station and the non-sensor station can be suppressed, and an access success rate of the sensor station can be effectively increased.

Optionally, as another embodiment, time t2 required by the sensor station to complete transmission of uplink data may be determined according to a size of the uplink data and a data transmission rate of the sensor station; and if the number of sensor stations is N2, duration of the time segment, in which the sensor station performs access contention, of the Beacon interval is N2*t2. For example, a value of N2 may be the number, which is determined according to a TIM flag in a current Beacon frame, of all the sensor stations; or a value of N2 may be the number, which is determined according to periods of uplink data of the sensor stations, of sensor stations that wake up in a current Beacon interval; or N sensor stations are first determined according to a TIM flag in a current Beacon frame, and a value of N2 may be the number, which is determined according to periods of uplink data of the N sensor stations, of sensor stations that wake up in a current beacon Beacon interval. Optionally, at an association stage, a STA may inform the AP of a service type of the STA in advance, and a period of uplink data may be determined according to a service type of a sensor application of a WLAN network. For example, the AP determines the number of sensor stations, which wake up in the current Beacon interval, according to a periodic feature of reporting time of electricity meter data, health information, environment monitoring information, and the like.

Figure 14:
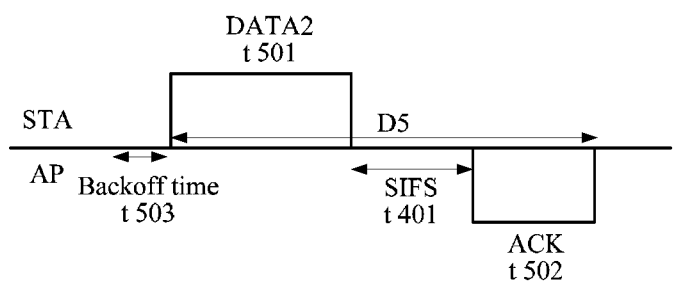
FIG. 14 is a schematic diagram of a manner of determining a time segment in which access contention is performed according to another embodiment of the present invention.

FIG. 14 is a schematic diagram of a manner of determining a time segment, in which a sensor station performs access contention, of a Beacon interval according to another embodiment of the present invention.

Specifically, as shown in FIG. 14, within one t2, a STA sends uplink data DATA2 to an AP (required time is recorded as t 501), and the AP replies to the STA with an ACK (required time is recorded as t 502). Therefore, duration of the time segment, in which the sensor station performs access contention, of the Beacon interval is as follows: D5=(t 501+t 401+t 502)*N2. Optionally, backoff time of each sensor station during access contention may be considered. For example, the AP collects statistics on the number of sensor stations in a current network, and acquires an empirical value t 503 of average backoff time, which corresponds to the number, of each sensor station during access contention. Therefore, the duration of the time segment, in which the sensor station performs access contention, of the Beacon interval is as follows: D5=(t 501+t 401+t 502+t 503)*N2. The uplink data DATA2 sent by the sensor station has a relatively short and fixed packet length, for example, the packet length of the uplink data DATA2 is 256 bytes. It should be understood that a value of the size of the uplink data is merely exemplary, and this embodiment of the present invention is not limited thereto. Optionally, time required for transmitting DATA2 may be obtained according to the packet length of DATA2 and a minimum data transmission rate, or time required for transmitting DATA2 may be obtained according to the packet length of DATA2 and an average data transmission rate. It should be understood that the minimum data transmission rate, the average data transmission rate, or the like may be used as a data transmission rate.

Further, the duration of the time segment in which the sensor station performs access contention does not exceed duration of the Beacon interval.

A time segment, in which a sensor station performs access contention, of a Beacon interval is used by the sensor station to contend for access to a channel, so as to send uplink data to an AP. Therefore, a power consumption increase caused by simultaneous contention of the sensor station and a non-sensor station can be avoided, and an access success rate of the sensor station can be increased. Optionally, the non-sensor station may enter a sleep state in the time segment in which the sensor station performs access contention, and wakes up at the beginning of a time segment in which all stations perform access contention, so as to contend for a channel to send uplink data. In this way, power consumption of the non-sensor station can be reduced.

FIG. 15 is a schematic diagram of a manner of carrying information about two time segments by a Beacon frame according to an embodiment of the present invention. In this embodiment of the present invention, although FIG. 15 shows a manner of carrying the information about the two time segments by the Beacon frame, such a manner is merely for ease of description. The Beacon frame may also carry information about more than two time segments. In addition, in this embodiment of the present invention, a manner of determining each of two time segments into which a Beacon interval is divided is not limited. That is, whatever manner of determining each of the two time segments into which the Beacon interval is divided falls into the scope of this embodiment of the present invention. It should also be understood that a manner of acquiring the two time segments is not limited in this embodiment of the present invention.

As shown in FIG. 15, an IE (Information Element, information element) includes three parts: an element identifier Element ID field, a length Length field, and a variable-length information Information field. The Element ID field is used for indicating a type of the IE, and it is defined in a standard that a specific Element ID is allocated to each type of element. Optionally, in this embodiment of the present invention, IDs 222 to 255 which are not allocated and are reserved in the standard may be used. The Length field is used for indicating the number of bytes occupied by the variable-length Information field. The variable-length Information field may indicate a time offset Timeoffset1 of an end time point, of a time segment in the two time segments and in which a sensor station performs access contention, of relative to a start point (for example, a flag is 0) of the Beacon interval; duration Duration1 of the time segment in which the sensor station performs access contention; a time offset Timeoffset2 of an end time point, of a time segment in the two time segments and in which all stations perform access contention, of relative to the start point of the Beacon interval; and duration Duration2 of the time segment in which all stations perform access contention.

In this embodiment of the present invention, an access point sends a Beacon frame, and a station receives the Beacon frame and acquires information about Timeoffset1, Duration1, Timeoffset1, and Duration2, where the information is carried in the Beacon frame. A time segment in which a sensor station performs access contention is [Timeoffset1, Timeoffset1+Duration1] in a Beacon interval, and a time segment in which all stations perform access contention is [Timeoffset2, Timeoffset2+Duration2] in the Beacon interval. Therefore, a power consumption increase caused by simultaneous contention of the sensor station and a non-sensor station can be effectively suppressed, and an access success rate of the sensor station can be effectively increased.

In addition, the non-sensor station may enter, according to the information about the two time segments, a sleep state in the time segment in which the sensor station performs access contention. In this way, power consumption of the non-sensor station can be effectively reduced.

In this embodiment of the present invention, an access point divides a beacon Beacon interval into two time segments, where one time segment is used by a sensor station to perform access contention, the other time segment is used by all stations to perform access contention, and the all stations include the sensor station and a non-sensor station. In this way, a power consumption increase caused by simultaneous contention of the sensor station and the non-sensor station can be suppressed, and an access success rate of the sensor station can be effectively increased.

In addition, the non-sensor station may enter, according to the information about the two time segments, a sleep state in the time segment in which the sensor station performs access contention. In this way, power consumption of the non-sensor station can be effectively reduced.

It may be clearly understood by a person skilled in the art that, for convenient and brief description, for a detailed working process of the foregoing system, apparatus, and unit, reference may be made to a corresponding process in the foregoing method embodiments.

Further, as a new embodiment, an access point 90 may implement the solution in which a beacon Beacon interval is divided into two time segments, and execute the foregoing processes. In this embodiment, a processor 91 is configured to divide a beacon Beacon frame sending interval into at least two time segments, where the at least two time segments include a first time segment and a second time segment, the first time segment is used by a sensor station to perform access contention, the second time segment is used by all stations to perform access contention, and the all stations include a non-sensor station and the sensor station; and a sending unit 92 is configured to send the Beacon frame, where the Beacon frame carries information about the first time segment and information about the second time segment.

The processor 91 determines the first time segment according to the number of sensor stations and a size of uplink data and a data transmission rate of the sensor station. The processor may further determine the number N of sensor stations according to a traffic indication map TIM flag in a current Beacon frame, determine, according to the size of the uplink data and the data transmission rate of the sensor station, time t required for completing transmission of the uplink data, and multiply the number N of sensor stations by the time t, to obtain the first time segment; or determine, according to periods of uplink data of the sensor stations, the number M1 of sensor stations that wake up in a current Beacon interval, determine, according to the size of the uplink data and the data transmission rate of the sensor station, time t required for completing transmission of the uplink data, and multiply the number M1 of sensor stations by the time t, to obtain the first time segment; or determine N sensor stations according to a TIM flag in a current Beacon frame, determine, according to periods of uplink data of the N sensor stations, the number M2 of sensor stations that wake up in a current beacon Beacon interval, determine, according to the size of the uplink data and the data transmission rate of the sensor station, time t required for completing transmission of the uplink data, and multiply the number M2 of sensor stations by the time t, to obtain the first time segment.

In this embodiment, the information about the first time segment includes: a time offset of a start time point, of the time segment in which the sensor station performs access contention, relative to a start time point of the beacon interval, and duration of the time segment in which the sensor station performs access contention; and the information about the second time segment includes: a time offset of a start time point, of the time segment in which all stations perform access contention, relative to the start time point of the beacon interval, and duration of the time segment in which all stations perform access contention.

Further, the present invention further provides another embodiment of a station. The station 100 may include: a receiving unit 1001, configured to receive a beacon Beacon frame sent by an access point AP, where the Beacon frame carries information about a first time segment and information about a second time segment, the first time segment is used by a sensor station to perform access contention, the second time segment is used by all stations to perform access contention, and the all stations include a non-sensor station and the sensor station; and a processor 1002, configured to acquire the information about the first time segment and the information about the second time segment, which are carried in the Beacon frame received by the receiving unit, select, according to a station type of the station, time to perform channel contention, and access a channel after the contention succeeds.

As an implementation manner, if the station is a non-sensor station, the processor 1002 enables, according to the information about the first time segment, the station to enter a sleep state in the first time segment. In this embodiment, the information about the first time segment includes: a time offset of a start time point, of the time segment in which the sensor station performs access contention, relative to a start time point of a beacon interval, and duration of the time segment in which the sensor station performs access contention; and the information about the second time segment includes: a time offset of a start time point, of the time segment in which all stations perform access contention, relative to the start time point of the beacon interval, and duration of the time segment in which all stations perform access contention.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit.

What is claimed is:

1. A method for accessing a wireless local area network, comprising:
    determining, by an Access Point (AP), a duration of a time segment according to a quantity of sensor stations, a size of uplink data, and a data transmission rate of the sensor stations in the wireless local area network; wherein in the time segment, only the sensor stations are allowed to perform access contention, wherein determining the duration of the time segment comprises:
        determining the quantity of sensor stations according to a traffic indication map (TIM) flag in a current beacon frame, which is N,
        determining, according to the size of the uplink data and the data transmission rate of the sensor stations, a time for completing transmission of the uplink data, which is t; and
        multiplying the N by the t, to obtain the duration of the time segment; and
    sending, by the AP, a beacon frame to a station, wherein the stations include the sensor stations and non-sensor stations, wherein the beacon frame carries information about the time segment.

2. The method according to claim 1, wherein the information about the time segment comprises:
    a time offset of a start time point of the time segment in which the sensor stations perform the access contention, which is related to a start time point of a beacon interval, and the duration of the time segment in which the sensor stations perform the access contention.

3. The method according to claim 1, wherein the beacon frame carries information about another time segment, wherein in the another time segment, all stations in the wireless local access network are allowed to perform the access contention.

4. An access point, comprising:
    a processor, configured to determine a duration of a time segment according to a quantity of sensor stations, a size of uplink data, and a data transmission rate of the sensor stations in a wireless local area network; wherein in the time segment, only sensor stations are allowed to perform access contention, wherein the processor is configured to:
- determine the quantity of sensor stations according to a traffic indication map (TIM) flag, which is N,
- determine, according to a size of uplink data and a data transmission rate of the sensor stations, a time for completing transmission of the uplink data, which is t, and
- multiply the N by the t, to obtain the duration of the time segment; and
- a transceiver, configured to send a beacon frame to a station, wherein the station include the sensor stations and non-sensor stations, wherein the beacon frame carries information about the time segment.

5. The method according to claim 4, wherein the beacon frame carries information about another time segment, wherein in the another time segment, all stations in the network are allowed to perform the access contention.

6. A method for accessing a wireless local area network, comprising:
- determining, by an Access Point (AP), a duration of a time segment according to a quantity of sensor stations, a size of uplink data, and a data transmission rate of the sensor stations in the wireless local area network; wherein in the time segment, only the sensor stations are allowed to perform access contention, wherein determining the duration of the time segment comprises:
  - determining, according to periods of uplink data of the sensor stations, the quantity of sensor stations that wake up in a current beacon interval, which is M1;
  - determining, according to the size of the uplink data and the data transmission rate of the sensor stations, a time for completing transmission of the uplink data, which is t; and
  - multiplying the M1 by the t, to obtain the duration of the time segment; and
- sending, by the AP, a beacon frame to a station, wherein the stations include the sensor stations and non-sensor stations, wherein the beacon frame carries information about the time segment.

7. An access point, comprising:
- a processor, configured to determine a duration of a time segment according to a quantity of sensor stations, a size of uplink data, and a data transmission rate of the sensor stations in a wireless local area network; wherein in the time segment, only sensor stations are allowed to perform access contention, wherein the processor is configured to:
  - determine, according to periods of uplink data of the sensor stations, the quantity of sensor stations that wake up in a current beacon interval, which is M1;
  - determine, according to a size of uplink data and a data transmission rate of the sensor stations, a time for completing transmission of the uplink data, which is t; and
  - multiply the M1 by the t, to obtain the duration of the time segment; and
- a transceiver, configured to send a beacon frame to a station, wherein the station include the sensor stations and non-sensor stations, wherein the beacon frame carries information about the time segment.

\* \* \* \* \*